Oct. 14, 1958  G. H. McLAFFERTY  2,855,753
RAMJET FUEL CONTROL HAVING A MAIN AND PROBE DIFFUSER
Filed Oct. 28, 1953  2 Sheets-Sheet 1
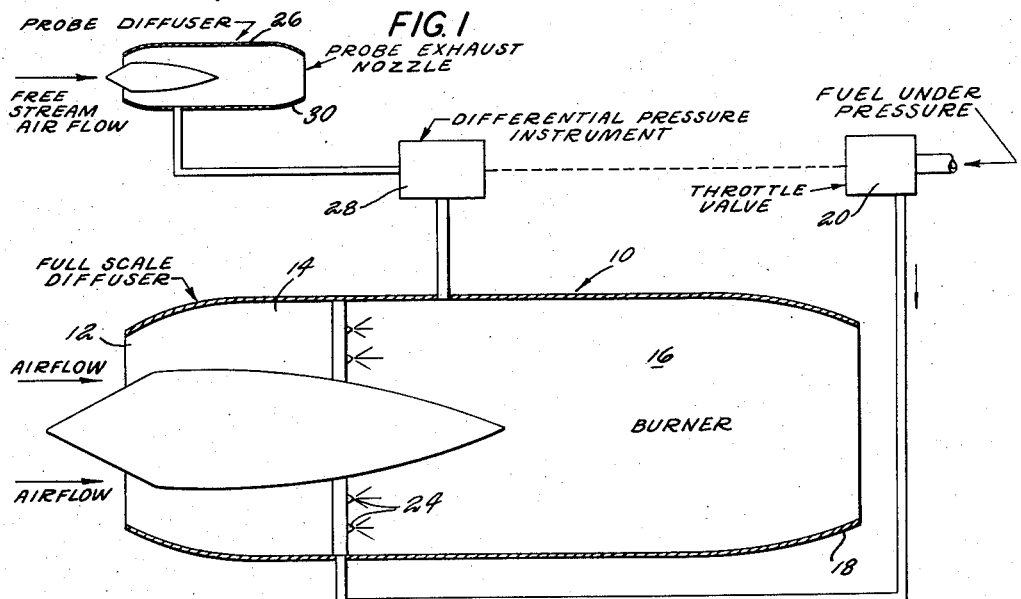
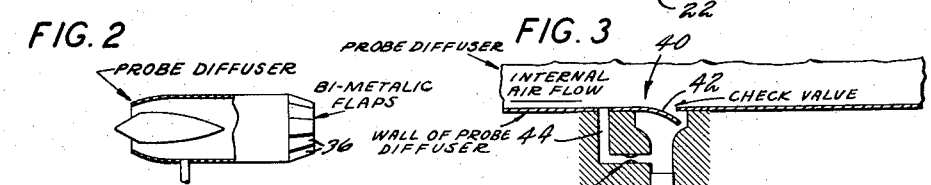
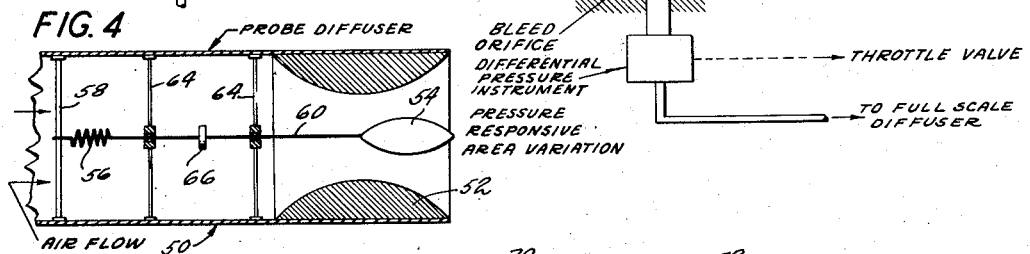
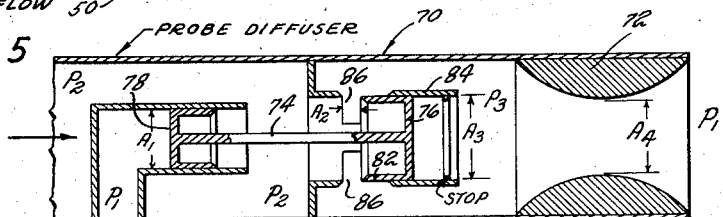
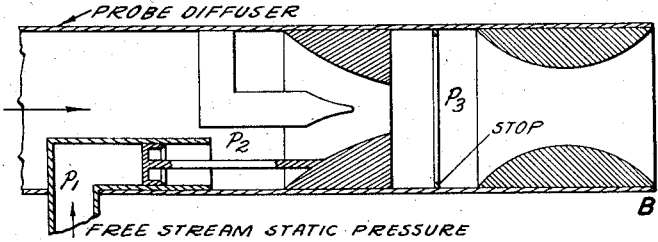
INVENTOR
GEORGE H. McLAFFERTY
BY *Leonard F. Wehrlin*
ATTORNEY

United States Patent Office 2,855,753
Patented Oct. 14, 1958

2,855,753

RAMJET FUEL CONTROL HAVING A MAIN AND PROBE DIFFUSER

George H. McLafferty, Manchester, Conn., assignor to United Aircraft Corporation, East Hartford, Conn., a corporation of Delaware Application October 28, 1953, Serial No. 388,865

12 Claims. (Cl. 60—35.6)

This invention relates to ramjet power plants and more particularly to controls therefor.

It is an object of this invention to provide a simple but efficient mechanism for controlling the fuel flow to a ramjet power plant.

It is a further object of this invention to provide a fuel control for a ramjet which includes a probe diffuser similar to that of the power plant and mechanism for controlling fuel to the ramjet in response to a parameter of operation of the probe diffuser.

It is another object of this invention to provide a fuel control for a ramjet power plant which includes a probe diffuser having characteristics similar to the diffuser of the power plant and means for comparing a parameter of operation of the power plant with the same parameter in the probe diffuser to obtain a fuel controlling signal.

These and other objects of this invention will become readily apparent from the following detail description of the drawings in which:

Fig. 1 is a schematic illustration of a ramjet power plant having a probe diffuser and fuel control system according to this invention.

Fig. 2 is a partial illustration of a probe diffuser having a variable-area exhaust nozzle.

Fig. 3 is a partial illustration of a valve for use with the fuel control system to eliminate undesirable operation.

Fig. 4 is a partial illustration of the exhaust nozzle of a probe diffuser having a modified variable-area exhaust nozzle.

Figs. 5 and 6 are cross-sectional illustrations of mechanisms for varying the flow to the probe diffuser in accordance with desired results.

Figure 7:
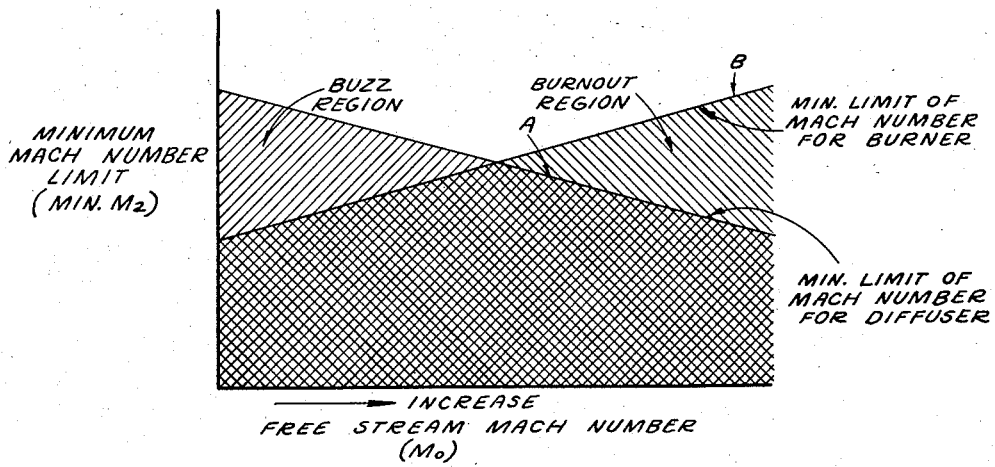
Fig. 7 is a graph illustrating operating limits of a ramjet.

Referring to Fig. 1, a ramjet power plant is generally indicated at 10 as having an air inlet 12, a diffuser section 14, a burner section 16 and an exhaust nozzle 18. Fuel is conducted from the throttle valve 20 via a line 22 to a plurality of fuel injection nozzles 24. According to this invention the throttle valve 20 is regulated to control the flow of fuel by means of a device which compares a parameter of operation of the main power plant with a similar parameter of a probe diffuser generally indicated at 26. The probe diffuser 26 has the same aerodynamic performance characteristics as the diffuser 14 of the main power plant 10. In other words, the probe diffuser 26 is approximately geometrically similar to the full-scale diffuser 14 except where slight variations might be necessary to correct for slight differences in performances of the two diffusers due to difference in size. The probe diffuser is mounted in the free airstream so as to sense the same flow as that which is flowing into and around the main ramjet power plant 10. A differential pressure instrument 28 is connected to the diffuser 26 and the diffuser 14 at corresponding stations so that the pressure at these stations is sensed and compared. The pressure instrument 28 may be of any well known type such as a diaphragm-operated device or a bellows mechanism. The differential instrument 28 compares the pressures of the diffusers 14 and 26 and in turn operates the throttle valve 20 so as to vary the amount of fuel flowing to the nozzles 24 of the main ramjet power plant 10 so as to make the pressure in the diffuser 14 equal to the corresponding pressure in the diffuser 26.

The probe diffuser 26 operates at a constant diffuser exit Mach number over a wide range of flight conditions when the exhaust flow from the probe diffuser is restricted by a constant-geometry nozzle or throttle 30. When a fixed exhaust nozzle such as 30 is utilized, the fuel control mechanism will respond so that the full-scale diffuser 14 will operate at the same diffuser exit Mach number that is obtained in the probe diffuser because the pressure recoveries are a function only of diffuser exit Mach number for a given set of free stream conditions.

For any given fixed value of fuel-air ratio, the ramjet diffuser exit Mach number increases with an increase in free stream total temperature. If it is desired to maintain a fixed fuel-air ratio in the full-scale engine over a range of free stream conditions, the required variation in diffuser exit Mach number in the probe diffuser 26 for proper fuel control can be obtained by utilizing an exhaust nozzle on the probe diffuser whose throat area will increase with an increase in free stream total temperature. One means for providing this variation in exhaust nozzle area is illustrated in Fig. 2. Herein a probe diffuser similar to that illustrated in Fig. 1 is shown as having a plurality of flaps 36 which are formed of bimetallic material. These flaps overlap slightly and with changes of free stream temperature will tend to move toward or away from the axis of flow through the diffuser so as to vary the exhaust area.

It is known that if the fuel-air ratio in a ramjet power plant is increased past the point at which the ramjet operates at maximum pressure recovery, a violent airflow oscillation known as "buzz" normaly occurs. The pressure during the buzz cycle varies from a low value to a high value equal to the maximm steady-state pressure recovery of the power plant diffuser. A large-scale diffuser such as illustrated at 14 in Fig. 1 will normally not buzz if the fuel to the power plant is controlled so as never to operate the diffuser past the operating point for maximum pressure recovery. Therefore, the peak pressure which should not be exceeded in the diffuser of the main power plant is equal to the maximum instantaneous pressure of a controlling probe diffuser which is caused to buzz by employing an exhaust nozzle on the probe diffuser of sufficiently small area. Hence, a controlling pressure from a buzzing probe diffuser can be obtained so as to avoid a buzzing operation in the main diffuser of the ramjet power plant. In order to obtain the proper pressure signal, the device illustrated in Fig. 3 may be utilized to modify the Fig. 1 system. Herein a check valve 40 is illustrated as having a thin flexible metal strip 42 located at an opening in the wall of the probe diffuser 26 where the pressure is being sensed for comparison in a pressure instrument such as 28 of Fig. 1. The flexible strip 42 will open to allow flow out from the probe diffuser only when the pressure in the probe diffuser is greater than the pressure on the outside of the metal strip. Over a period of time pressure on the under side or outside of the metal strip will approach the maximum instantaneous pressure occuring during the buzz cycle in the probe diffuser. This check valve device requires a small vent generally indicated at 44 which connects the outside of the check valve 40 back to the inside of the probe diffuser so that the pressure outside of the metal strip 42 will decrease if the peak instantaneous pressure in the probe diffuser decreases as a result of a change in free stream conditions.

A device which will produce the same result as that illustrated in Fig. 2 is shown in Fig. 4. In other words, this structure, when utilized in a probe diffuser of the type illustrated in Fig. 1, will control the flow of fuel in a main ramjet power plant so as to maintain a fixed fuel-air ratio. Whereas the Fig. 2 construction used bi-metallic flaps which responded to temperature, the Fig. 4 mechanism responds to pressure to vary the area of the exhaust nozzle of the probe diffuser. It is known that at high free stream Mach numbers and at low altitudes the free stream total pressures increase as well as the free stream total temperatures. Hence, as illustrated in Fig. 4, the aft portion 50 of a typical probe diffuser is shown as having a restriction 52 in the exhaust nozzle and a movable plug 54 which cooperates with the restriction 52 to vary the area of the exhaust nozzle. A simple tension spring 56 is fixed at one end to a strut 58 while the other end of the spring is connected to a reciprocable rod 60 rigidly connected to the plug 54. Bearing-like supports 64 are provided for the rod 60. A stop 66 which may be adjustable is positioned on the rod 60 so as to limit the movement of the plug 54 as desired. As the free stream total pressure then increases, it tends to move the plug in an aft direction so that the nozzle area of the probe diffuser increases with an increase in free stream total pressure. The bi-metallic flaps utilized in Fig. 2 are intended to operate in a similar manner under increased temperature conditions.

The structure shown in Fig. 4 uses a spring biased plug 54 to set or limit fuel-air ratio and a stop 66 is provided to limit plug travel to prevent the main power plant diffuser from operating below its minimum stable diffuser exit Mach number limit. Since the minimum stable diffuser exit Mach number of the diffuser is a function of free stream Mach number, it may be desirable to vary the position of the stop by the devices given in Figs. 5 and 6 which respond to free stream Mach number. It is apparent that varying the position of a mechanical stop may present construction and operational problems. Hence, the same result may be obtained with the devices illustrated in Figs. 5 and 6 employed directly to vary the effective nozzle area of the probe diffuser.

Referring to Fig. 5, the aft portion of a probe diffuser 70 is shown as having an exhaust nozzle 72 and a free-floating piston assembly 74 located within the probe diffuser. Free-floating piston 74 includes a large piston head 76 and a small piston head 78. The smaller piston head 78 is exposed to free stream static pressure via a line 80 while the large piston head 76 is exposed to local total pressure which is flowing into the diffuser. The large piston head 76 has the sides 82 thereof cooperating with a sleeve 84 having a port 86. It will be apparent then that the position of the piston 74 and the piston head 76 will control the amount of the opening of the port 86.

As set forth herein, it is shown mathematically that the position of the piston head 76 or the area of the opening of the port 86 is a function only of the ratios of the pressures acting on each of the piston heads 76 and 78 and it is possible, by proper choice of the areas, to make the orifice area 86 inversely proportional to pressure ratio. Thus, the mechanism herein may be used to indicate or control free stream Mach number since free stream Mach number is a function of the ratio of probe diffuser total pressure to free stream static pressure. Therefore, when used in conjunction with a full-scale diffuser and combustion chamber, the probe diffuser pressure which is fed to the fuel control system can be made to be a function of a curve where the probe diffuser exit Mach number decreases with increased free stream mach number.

From the Fig. 6 construction it will be apparent that it will operate in the same manner as the Fig. 5 mechanism, Fig. 6 being a mere modified version thereof.

The device of Figs. 5 and 6 employs two interconnected pistons which float free relative to the housing. The device is designed so that the position of the piston assembly is a function only of the total pressure ratio $(P_2/P_1)$ supplied to the device. The position of the piston fixes the orifice area, $A_2$. Two equations are of interest in deriving the relation between pressure ratio and $A_2$. In Fig. 5 the net force on the piston must be zero. Neglecting gravitation or acceleration forces, $$(P_2-P_1)A_1=(P_2-P_3)A_3$$

where all static pressures are assumed equal to total pressures. Consider the case in which the pressure ratios, $P_2/P_3$ and $P_3/P_1$, are sufficient to choke both the orifice and the nozzle. From the equation of continuity $$Q_2A_2P_2=Q_4A_4P_3$$

$$P_3=P_2\frac{A_2Q_2}{A_4Q_4}$$

where $Q_2$ and $Q_4$ are the flow coefficients of the orifice and nozzle, and are assumed to be constant. Combining the above relations $$(P_2-P_1)A_1=\left[P_2-P_2\left(\frac{A_2Q_2}{A_4Q_4}\right)\right]A_3$$

$$\frac{P_2-P_1}{P_2}\frac{A_1}{A_3}=\left[1-\frac{A_2Q_2}{A_4Q_4}\right]$$

$$\frac{A_2Q_2}{A_4Q_4}=1-\frac{A_1}{A_3}\left(1-\frac{P_1}{P_2}\right)$$

$$A_2=\frac{Q_4A_4}{Q_2}\left(1-\frac{A_1}{A_3}\right)+\frac{A_4Q_4}{Q_2}\frac{A_1}{A_3}\frac{P_1}{P_2}$$

Therefore, $A_2$ is a function only of pressure ratio and several constants which may be chosen to fit the individual problem. The variation of piston position with pressure ratio may be controlled by proper choice of the variation of orifice area, $A_2$, with piston position.

The above derivation applies to the form of the device shown in Fig. 5. A similar derivation could be made for the form of the device shown in Fig. 6. Diaphragms or bellows may be substituted for the pistons shown in Figs. 5 and 6.

The device has two characteristics of interest, both of which may be used in fuel control systems. The first characteristic is that the position of the piston assembly is governed entirely by the pressure ratio supplied, $P_2/P_1$. If $P_2$ is free stream pitot pressure and $P_1$ is free stream static pressure, the device may be used to indicate or control Mach number, since Mach number is determined by the ratio of pitot to static pressure. In a probe diffuser which employs a spring-mounted plug to set or limit fuel-air ratio, a stop can be used to limit the plug travel and to prevent the engine from operating beyond the stable limit of the diffuser. In some cases, it is desirable to vary the position of the stop with free stream Mach number, since the minimum stable diffuser exit Mach number is a function of free stream Mach number, and in these cases the device given in Figs. 5 or 6 may be employed. In such an application the pressure ratio may be obtained either from free stream pitot and free stream static pressure, or from probe diffuser exit pressure and free stream static pressure.

The second characteristic of the device of interest is that the airflow through the system, which is proportional to the orifice area, $A_2$, varies inversely as the pressure ratio supplied, $P_2/P_1$ for a fixed value of $P_2$. This characteristic may be used in a probe diffuser in which it is desired to decrease the diffuser exit Mach number as the free stream Mach number is increased. Routing part or all of the air in the probe diffuser through the device given in Figs. 5 and 6 would result in a decrease in diffuser exit Mach number with an increase in free stream Mach number.

To better define the operational aspects of the structures, the following summary and description of the functions of the devices follows. A modified form of these devices is also described below.

It should be noted that the diffuser exit Mach number, $M_2$ (and hence pressure recovery), of a fixed-geometry ramjet engine is a function only of fuel-air ratio, free stream total temperature, and combustion efficiency. The $M_2$ (and hence pressure recovery) of a probe diffuser is a function of the ratio of the diffuser exit area to the throat area of the exhaust nozzle. Also, to a very slight extent, $M_2$ is a function of the Reynolds number (pressure level) in the probe diffuser, but this is considered negligible for purposes of this discussion.

If the corresponding pressures in a full-scale diffuser and a probe diffuser are made equal (as in Fig. 1) and if the two diffusers have the same performance characteristics, the values of $M_2$ of the two configurations will be equal at all free stream Mach numbers, angles of attack and altitudes. In other words with geometrically similar diffusers each will produce a similar variation in pressure recovery with variations in free stream Mach number and variations in angle of attack for a given diffuser exit Mach number. Defined in another way it can be said that geometrically similar diffusers, operating at the same free stream Mach number and angle of attack, will produce the same variations of pressure recovery with variation of diffuser exit Mach number.

It then follows that if the exhaust nozzle of the probe diffuser has a fixed area, the $M_2$ of the full-scale engine and probe diffuser will be constant as well as equal at all free stream Mach numbers, angles of attack and altitudes. Fixing $M_2$ requires an increase in fuel-air ratio if free stream total temperature increases. Increases in free stream total temperature result from an increase in free stream Mach number or from a decrease in altitude.

If it is desired to hold fuel-air ratio constant, $M_2$ of the full-scale engine must increase with an increase in free stream total temperature. Therefore, the $M_2$ of the probe diffuser must increase with an increase in free stream total temperature. One mechanical means of doing this is to have a bi-metallic exhaust nozzle (Fig. 2) whose throat area increases with an increase in total temperature. For many applications, a spring-mounted movable plug (Fig. 4) may be provided in the exhaust nozzle of the probe diffuser in substitution for the bimetallic type variable area nozzle. This substitution may be made because pressure level increases with the same variables (increased Mach number or decreased altitude) as total temperature and because the changes in probe nozzle throat area are small.

In some cases, the maximum possible thrust of a ramjet is not operationally limited by the maximum fuel-air ratio that the burner can tolerate but instead is limited by the stability limit of the diffuser. For example, the minimum stable $M_2$ of a diffuser usually decreases with increase in free stream Mach number as illustrated in Fig. 7. Thus, for example, if the curve A in Fig. 7 were located relatively higher than the curve B the diffuser minimum stable $M_2$ would be controlling over a majority of free stream Mach numbers, hence, it would be more desirable to limit along curve A rather than curve B. Therefore, a ramjet engine may be held to a thrust commensurate with the diffuser limits by employing an exhaust nozzle in the probe diffuser which has a nozzle throat area which decreases with free stream Mach number. The devices shown in Figs. 5 and 6 have an effective throat area which decreases with increased pressure ratio, and the pressure ratio across the exhaust nozzle increases with an increase in free stream Mach number.

If the curves A and B of Fig. 7 for any power plant combination become incompatible to the extent that limiting along one curve is unsatisfactory, the probe diffuser may be constructed with two exhaust nozzles in parallel, one nozzle being similar to Figs. 2 or 4 and the other similar to that shown in Figs. 5 or 6. Hence, by proper placement of stops on each nozzle it is possible to approximate both the burner limit and diffuser limit over a range of free stream conditions. A device of this sort is illustrated in Fig. 8.

Figure 8:
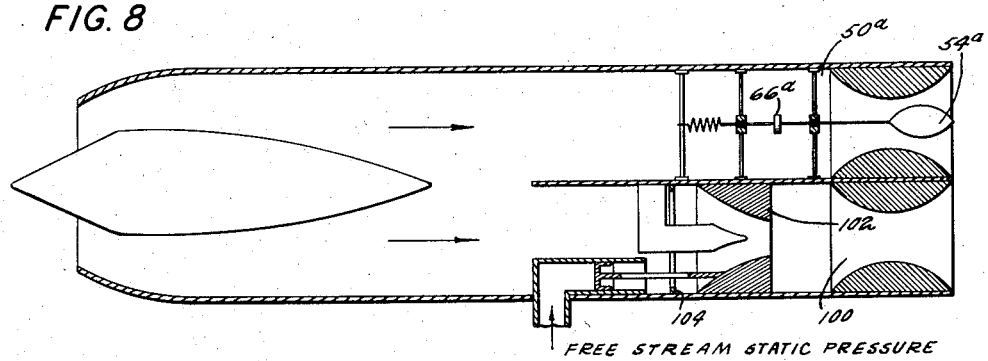
Fig. 8 is a cross-sectional illustration of a probe diffuser having combined characteristics for varying the exhaust area of the diffuser.
Figure 9:
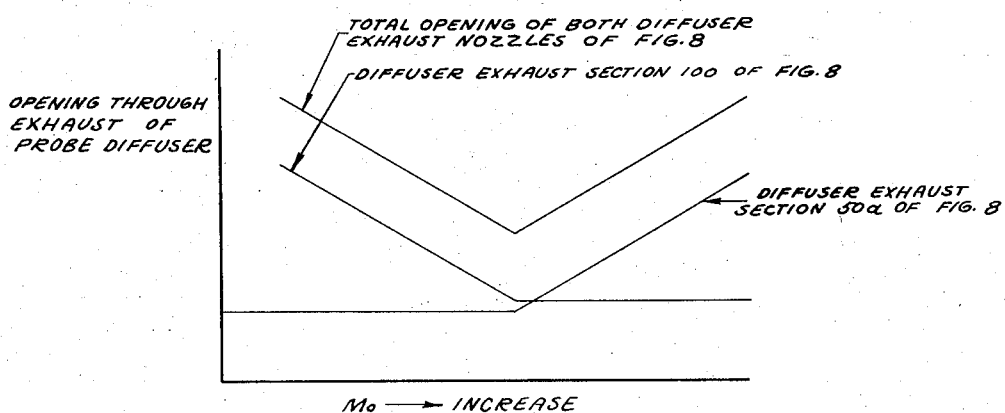
Fig. 9 is a graph illustrating the operating characteristics of the Fig. 8 structure.

Referring to Fig. 8, at low free stream Mach numbers the stop 66a of the probe diffuser section 50a comes into play so that it would be positioned in its extreme lefthand position. The diffuser section 100 has its movable valve element 102 moving toward the left as the free stream Mach number increases so as to decrease the diffuser exit Mach number. Hence the diffuser portion 100 will be decreasing the opening of its valve element 102 until it abuts the stop 104. After this, with increasing free stream Mach number the plug 54a of the section 50a will move toward the right thereby increasing the opening of that portion of the probe diffuser nozzle. As a result the total opening of the two diffuser sections can be represented by the graph in Fig. 9. The reason for this variable control of the exhaust flow from the probe diffuser is apparent from the graph shown in Fig. 7. Herein it is noted that the minimum critical diffuser exit Mach number for the diffuser decreases with increases in free stream Mach number. Below this minimum diffuser-exit Mach number, buzz occurs in the diffuser of a ramjet power plant so that fluctuation in pressure occurs. On the other hand the minimum diffuser-exit Mach number limit for the burner section increases with increased free stream Mach number. Therefore over a range of free stream Mach numbers, the limiting is done along the upper portion of curve A until the intersection with curve B. The remainder of the limiting with increased Mach number is done along the upper portion of curve B.

An alternate method of obtaining operation at the diffuser limit of the main power plant is to operate at slightly less than maximum diffuser pressure recovery. If the probe diffuser is caused to buzz by restricting the exhaust nozzle area a sufficient amount, the peak pressure recovery during the buzz cycle will be equal to the peak steady-state pressure recovery. By using a device such as shown in Fig. 3, the pressure signal from the probe diffuser can be made equal to or slightly less than the peak pressure recovery during the buzzing cycle of the probe diffuser. This device does nothing to prevent the burner from operating below its minimum diffuser-exit Mach number.

Although only certain embodiments of this invention have been illustrated and described herein, it will be apparent that various changes and mondifications may be made in the construction and the arrangement of the various parts without departing from the scope of this novel concept.

What it is desired to obtain by Letters Patent is:

1. In combination, a pair of diffusers exposed to the same airstream and receiving air therefrom, said diffusers having similar fluid flow characteristics therethrough whereby they produce similar exit Mach numbers over a range of free stream Mach numbers, a combustion chamber receiving air from one of said diffusers and having a source of fuel therefor, and means responsive to a parameter of operation other than fuel flow of the other of said diffusers for controlling the flow of fuel from said source to said combustion chamber.

2. In a ramjet power plant having a diffuser, a combustion chamber receiving air from the diffuser and an exhaust nozzle discharging fluid received from said chamber, a source of fuel under pressure, means for regulating the flow of fuel from said source to said combustion chamber, a probe diffuser exposed to the free airstream and having fluid flow characteristics therethrough which are similar to those of said first mentioned diffuser, said probe diffuser including an exhaust nozzle therefor, means for varying the area of said last mentioned exhaust nozzle, and means responsive to a parameter of operation of said probe diffuser for controlling said regulating means.

3. In a ramjet according to claim 2 including temperature responsive means for varying the area of said last mentioned nozzle.

4. In a ramjet according to claim 2 including pressure responsive means for varying the area of said last mentioned nozzle.

5. In a power plant having a main diffuser, a combustion chamber receiving air from the diffuser and an exhaust nozzle for the combustion chamber, a source of fuel under pressure, means for regulating the flow of fuel from said source to said combustion chamber, a probe diffuser having fluid flow operating characteristics substantially proportional to those of said first mentioned diffuser exposed to the free airstream during flight and having only an exhaust nozzle therefor, and means responsive to at least one pressure at a predetermined point in the probe diffuser and at least one pressure in said main diffuser for controlling said regulating means.

6. In a power plant having a main diffuser, a combustion chamber receiving air from the diffuser and an exhaust nozzle for the combustion chamber, a source of fuel under pressure, means for regulating the flow of fuel from said source to said combustion chamber, a probe diffuser having fluid flow characteristics substantially proportional to those of said first mentioned diffuser and exposed to the free airstream during flight, an exhaust nozzle for said probe diffuser having air flowing therefrom, and means responsive to at least one parameter of operation of said probe diffuser and at least one parameter of operation of said main diffuser for controlling said regulating means.

7. In combination, a pair of diffusers exposed to the same airstream and receiving air therefrom, said diffusers having similar fluid flow characteristics therethrough, a combustion chamber receiving air from one of said diffusers and having a source of fuel therefor, and means responsive to the pressure at a predetermined point in said other diffuser for controlling the flow of fuel from said source to said combustion chamber, and a pressure ratio responsive device for varying the amount of airflow out of said other diffuser.

8. In a fuel control for a ramjet power plant, the ramjet including a diffuser receiving air from the airstream, a combustion chamber downstream of said diffuser and an exhaust nozzle for said combustion chamber, a source of fuel under pressure, means for conducting fuel from said source to said combustion chamber including throttle valve mechanism, a second diffuser receiving air from the airstream including a nozzle discharging air therefrom, said second diffuser having fluid flow characteristics similar to said first mentioned diffuser, means for producing a signal commensurate with a parameter of operation of said second diffuser, a signal receiver operatively connected to said signal producing means, and means operatively connecting said receiver and said throttle valve mechanism.

9. In a fuel control for a ramjet power plant, the ramjet including a diffuser receiving air from the airstream, a combustion chamber downstream of said diffuser and an exhaust nozzle for said combustion chamber, a source of fuel under pressure, means for conducting fuel from said source to said combustion chamber including throttle valve mechanism, a second diffuser receiving air from the airstream including a nozzle discharging air therefrom, said second diffuser having fluid flow characteristics similar to said first mentioned diffuser, means for producing a signal commensurate with a parameter of operation of said first mentioned diffuser, means for producing a signal commensurate with a similar parameter of operation of said second diffuser, and means operatively connected to said throttle valve mechanism for comparing said signals and producing a resultant controlling signal.

10. In a ramjet power plant having a diffuser, a combustion chamber receiving air from the diffuser and an exhaust nozzle discharging fluid received from said chamber, a source of fuel under pressure, means for regulating the flow of fuel from said source to said combustion chamber, a probe diffuser exposed to the free airstream and having fluid flow characteristics similar to those of said first mentioned diffuser, said probe diffuser including an exhaust nozzle therefor, means for varying the amount of airflow from said probe diffuser exhaust nozzle including mechanism for decreasing the amount of flow therethrough with increased free stream Mach number over a predetermined low range thereof, second means for varying the amount of airflow from said probe diffuser exhaust nozzle including mechanism for increasing the amount of flow therethrough with increased free stream Mach numbers over a predetermined high range thereof, and means responsive to a parameter of operation of said probe diffuser for controlling said regulating means.

11. In combination, a pair of diffusers exposed to the same airstream and receiving air therefrom, said diffusers having similar flow characteristics therethrough, a combustion chamber receiving air from one of said diffusers and having a source of fuel therefor, means for regulating the flow of fuel from said source to said combustion chamber, a connection between said regulating means and a predetermined point in the other of said diffusers, and a valve in said connection for controlling the flow to said regulating means.

12. In combination, a pair of diffusers exposed to the same airstream and receiving air therefrom, said diffusers having similar fluid flow characteristics whereby they produce substantially equal exit Mach numbers over a range of free stream Mach numbers, and means responsive to a parameter of operation of one of said diffusers for controlling a different parameter of operation of the other of said diffusers.

References Cited in the file of this patent

UNITED STATES PATENTS

| | | |
|---|---|---|
| 2,606,420 | Moore | Aug. 12, 1952 |
| 2,654,995 | Ostroff | Oct. 13, 1953 |
| 2,669,837 | Harris | Feb. 23, 1954 |
| 2,679,726 | Moncrieff | June 1, 1954 |
| 2,683,348 | Petry | July 13, 1954 |
| 2,687,612 | Anderson | Aug. 31, 1954 |
| 2,688,845 | Ostroff | Sept. 14, 1954 |
| 2,705,046 | Schroeder | Mar. 29, 1955 |
| 2,736,166 | Mock | Feb. 28, 1956 |

FOREIGN PATENTS

| | | |
|---|---|---|
| 578,311 | Great Britain | June 24, 1946 |